United States Patent [19]
Fedele et al.

[11] Patent Number: 4,663,660
[45] Date of Patent: May 5, 1987

[54] COMPRESSED QUANTIZED IMAGE-DATA TRANSMISSION TECHNIQUE SUITABLE FOR USE IN TELECONFERENCING

[75] Inventors: Nicola J. Fedele, Middlesex County, N.J.; Alfonse Acampora, Richmond County, N.Y.; Peter J. Burt, Mercer County; Rajesh Hingorani, Middlesex County, both of N.J.

[73] Assignee: RCA Corporation, Princeton, N.J.

[21] Appl. No.: 876,994

[22] Filed: Jun. 20, 1986

[51] Int. Cl.⁴ .............................................. H04N 7/13
[52] U.S. Cl. ...................................... 358/136; 358/13; 358/133
[58] Field of Search ............... 358/133, 136, 135, 140, 358/13, 11

[56] References Cited

U.S. PATENT DOCUMENTS

| | | | |
|---|---|---|---|
| 4,200,886 | 4/1980 | Musmann et al. | 358/135 |
| 4,447,886 | 5/1984 | Meeker | 364/725 |
| 4,603,350 | 7/1986 | Arbeiter | 358/140 |

OTHER PUBLICATIONS

Co-pending patent application Ser. No. 596,817, Carlson et al., filed Apr. 4, 1984, assigned to RCA Corporation, Princeton, NJ.
Co-pending currently-allowed patent application Ser. No. 685,239, Arbeiter et al., filed Dec. 21, 1984, assigned to RCA Corporation, Princeton, NJ.
Co-pending patent application Ser. No. 774,984, Anderson, filed Sep. 11, 1985, assigned to RCA Corporation, Princeton, NJ.

Primary Examiner—Howard W. Britton
Attorney, Agent, or Firm—Joseph S. Tripoli; George J. Seligsohn

[57] ABSTRACT

A technique for transmitting compressed quantized image-data from a transmitter to a receiver over a limited bandwidth communication channel employs temporal differential pulse code modulation incorporating pyramid image processing spectrum analyzers and synthesizers. This technique permits the selective elimination by data-compression of only those portions of the original image information which contribute least to the perception of image quality by a viewer of a synthesized display image at the receiver.

20 Claims, 7 Drawing Figures

COMPRESSED QUANTIZED IMAGE-DATA TRANSMISSION TECHNIQUE SUITABLE FOR USE IN TELECONFERENCING

BACKGROUND OF THE INVENTION

I. Field of the Invention

This invention relates to a technique for transmitting compressed quantized image-data from a transmitter to a receiver over a limited bandwidth communication channel, which technique employs temporal differential pulse code modulation (DPCM) and data-compression (entropy-reducing) encoding. More particularly, the invention relates to such a technique in which the DPCM incorporates pyramid image processors.

II. Description of the Prior Art

In general, it is well known to employ DPCM and image-data compression encoding to transmit image data, such as that derived from a television video signal, over a limited bandwidth communication channel, such as a telephone line or a somewhat wider limited bandwidth channel which is still significantly narrower than that required to transmit in real time an uncompressed standard bandwidth television video signal (e.g., an NTSC television video signal).

There is a substantial cost saving in transmitting the compresed image data of a television video signal over a limited bandwidth communication channel, with the amount of saving rising as the amount of compression rises and, hence, the required bandwidth of the communication channel narrows. However, the price to be paid for this cost saving is that the image displayed at the receiver tends to be degraded by an amount which rises as a direct monotoric function of the amount of a compression of the transmitted image data. The reason for this is that the compression of image data at the transmitter often results in the loss of image information in an amount that corresponds with the amount of compression. Since this lost image information can never be recovered at the receiver, the displayed image is degraded in accordance with this loss. The result is that, in the past, a DPCM, image-data-compressed encoded transmission system capable of displaying at the receiver an image of sufficiently high quality (i.e., sufficiently high spatial resolution and gray scale) to be practical for teleconferencing, permitted only a relatively small amount of image-data compression. Thus, the savings in communication-channel bandwidth and the cost thereof was relatively small. Consequently, the current cost of teleconferencing remains too high to sustain widespread use.

Spatial-frequency spectrum analyzers and synthesizers employing so-called "pyramids" have been developed for processing in delayed real time images represented by a television video signal. In this regard, reference is made to co-pending patent application Ser. No. 596,817, filed Apr. 4, 1984; co-pending currently-allowed patent application Ser. No. 685,239, filed Dec. 21, 1984; and co-pending patent application Ser. No. 774,984, filed Sept. 11, 1985—all of which co-pending patent applications are assigned to the same assignee as the present invention. Patent application Ser. No. 596,817 discloses a Burt Pyramid spectrum analyzer, a filter-subtract-decimate (FSD) pyramid spectrum analyzer, and a Burt Pyramid synthesizer. Currently-allowed patent application Ser. No. 685,239, which is directed to an interlaced digital video input filter/-decimator and/or expander/interpolation filter, discloses in some detail an image processing system employing a Burt Pyramid analyzer and synthesizer, together with a time-skew correction delay means required therewith. Patent application Ser. No. 774,984, discloses an FSD pyramid synthesizer.

All of the pyramid spatial frequency spectrum analyzers disclosed in the aforesaid copending patent applications operate to derive a plurality of separate sub-spectra output video signals, wherein each sub-spectrum output video signal below the highest spatial frequency sub-spectrum output video signal exhibits a pixel density which is below that of its immediately next-higher sub-spectrum output video signal. The plurality of separate sub-spectra output video signals is comprised of one or more bandpass video signals, preferably having a nominal spatial-frequency bandwidth of one octave of the spatial-frequency spectrum in each dimension of the image represented by the analyzed video signal, and a low-pass remnant video signal comprised of the spatial frequencies contained in that portion of the spatial frequency spectrum, in each dimension of the image represented by the analyzed video signal, which is below those contained in the lowest bandpass video signal.

The pyramid spatial frequency spectrum synthesizers disclosed in the aforesaid copending patent applications operate to derive a single synthesized video signal from the separate sub-spectra output video signals, which synthesized video signal corresponds to the original television video signal that has been analyzed.

As is fully explained in the aforesaid co-pending patent application Ser. No. 596,817, such pyramid image processing tends to match the operation of the human visual system in each of four distinct ways. First, the human visual system appears to compute a primitive spatial-frequency decomposition of luminuous images, by partitioning spatial frequency information into a number of contiguous, overlapping spatial-frequency bands, so that spatial frequency information more than a factor of two away from other spatial frequency information is independently processed by the human visual system. Second, the spatial-frequency processing that occurs in the human visual system is localized in space, so that overlapping image subregions that are roughly two cycles wide at each particular spatial frequency are separately processed. Third, the threshold contrast-sensitivity function of the human visual system falls off rapidly as the image spatial frequency increases. Fourth, the ability of the human visual system to detect a change in contrast which is above threshold, is also better at lower spatial frequencies than at higher spatial frequencies.

SUMMARY OF THE INVENTION

The present invention is directed to an improved technique which can be used to significantly increase the amount of compression of image data that can be tolerated in the transmission to and display of an image of given quality at the receiver. Put another way, the present invention is directed to maximizing the quality of the displayed image at the receiver that can be achieved with a given amount of compression of the image data transmitted to the receiver. Thus, the required bandwidth (and, hence, cost) of the communication channel needed for transmission of the compressed image-data is significantly decreased.

The present invention achieves its intended purposes by improvements in the DPCM employed by the transmitter and the inverse DPCM employed by the receiver. These improvements in the DPCM and the inverse DPCM result from the incorporation of pyramid image processers therein. The use of such pyramid image processing makes it possibly to discriminatingly discard, in the compression of the image data, substantially only those portions of the original image information which contribute least to the quality of the displayed image perceived by a viewer thereof at the receiver.

One benefit of the present invention is that it makes teleconferencing significantly more cost effective.

More specifically, the present invention is directed to an improved technique for transmitting compressed image-data, derived from a given video signal that defines the gray-scale level value of each successive pixel of each of successive frames of uncompressed original television images that exhibit a given relatively high pixel density, over a limited bandwidth communication channel to a receiver. At the receiver, successive frames of television images derived from the transmitted compressed image-data are displayed.

In accordance with the principles of the present invention, an ordinally arranged set of (N+1) separate video signals, where N is a specified integer, are derived from a combination of the given video signal and a feedback signal that defines the difference in level values of corresponding pixels of at least each pair of successive frames of the original television images. The first separate video signal of the set defines the highest spatial frequency bandpass sub-spectrum image component of the spatial frequency spectrum of the differential image corresponding to at least that pair of successive frames of the original television images. The image component of the differential image defined by this first separate video signal of the set exhibits a first pixel density that is equal to or less than the given pixel density. Each other separate video signal of the set except the last separate video signal of the set defines the spatial frequency bandpass sub-spectrum image component of the spatial frequency spectrum that is lower than that defined by its immediately preceding separate video signal of the set. The image component of the differential image defined by each other separate video signal of the set exhibits a pixel density that is less than the pixel density exhibited by the image component defined by its immediately preceding separate video signal of the set. The last separate video signal of the set defines a spatial frequency lowpass sub-spectrum image component of the spatial frequency spectrum that is lower than that defined by its immediately preceding separate video signal of the set. The pixel density of the image component of the differential image defined by the last separate video signal of the set is no greater than the pixel density exhibited by the image component defined by its immediately preceding separate video signal of the set.

The video signals of the set are quantized to reduce the number of gray-scale level values of the pixels of at least one of the separate video signals of the set. Subsequent to such quantizing, the separate video signals of the set are separately compression-encoded to reduce redundant information (thereby reducing the entropy and the average data rate), and then the compression-encoded separate video signals are transmitted to the receiver over the limited bandwidth communication channel. Further, subsequent to such quantizing, the aforesaid feedback signal is derived from the separate video signals of the set.

DESCRIPTION OF THE PREFERRED EMBODIMENTS

Figures 1, 2:
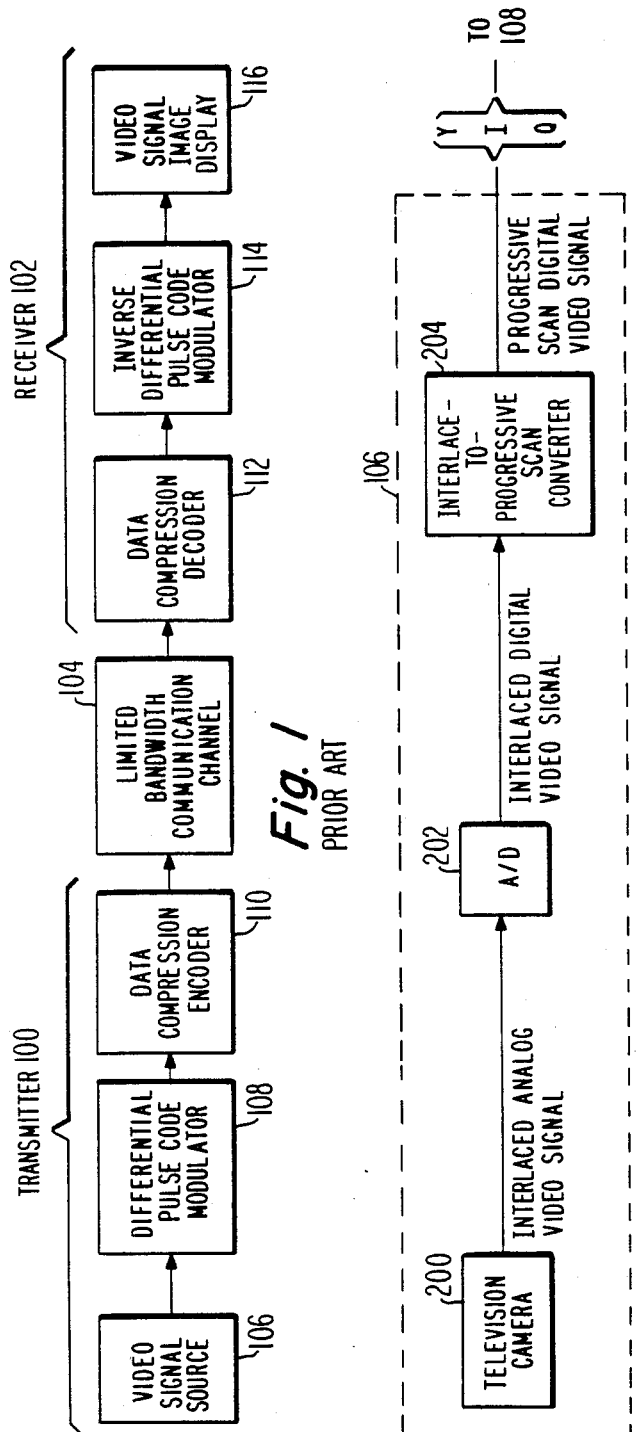
FIG. 1 is a block diagram of the type of compressed image-data transmission system, known in the prior art, to which the present invention is an improvement.
FIG. 2 is a block diagram of an embodiment of the video signal source of FIG. 1 which may be employed by the present invention.

FIG. 1 illustrates a system, known in the prior art, for transmitting compressed image-data from a transmitter 100 to a receiver 102 over a limited bandwidth communication channel. Transmitter 100 includes video signal source 106, DPCM 108 and data compression encoder 110.

Video signal source 106 may include a television camera, video tape recorder, or the like, to provide a given video signal at its output. This given video signal defines the gray-scale level value of each successive pixel of each of successive frames of uncompressed original television images that exhibit a given relatively high pixel density.

The given video signal is applied as an input to DPCM 108. DPCM 108 provides a video signal output that defines a differential image. In its simplest form, DPCM 108 derives a differential image from the difference in level values of corresponding pixels of each pair of successive frames of the original television images defined by its given video signal input. In more complex forms, the differential image may be derived by DPCM 108 by operating on the difference in level values of corresponding pixels of more than two successive frames of the original television images, or, alternatively, may be derived by a temporal or spatio-temporal filter operating on successive frames of the original television images. In any case, DPCM 108 is effective in eliminating that portion of image data present in any frame of the given video signal from source 106 that is identical to image data already contained in a preceding frame or frames of the given video signal. Therefore, the image data contained in the output video signal of DPCM 108 is limited substantially solely to that required to update the image data already obtained from the preceding frame or frames.

The output video signal from DPCM 108 is then applied as an input to data compression encoder 110, which may further reduce the amount of data of video output signal from DPCM 108 to an amount which can be transmitted in real time to receiver 102 over limited bandwidth communication channel 104. In order to accomplish this, data compression encoder 110 includes a statistical data redundancy-reduction means (such as a run-length encoder and/or a Huffman encoder, both of which are known in the art). In order to provide even more image-data compression, at the expense of gray-scale resolution of the differential image data, the level values of the pixels of the differentiated image are usually quantized prior to being applied to data compression encoder 110, thereby reducing the gray-scale resolution to a limited number of possible preselected pixel level values (the fewer the number of quantized pixel level values, the greater the amount of data compression and the greater the loss of picture quality).

Receiver 102 is comprised of data compression decoder 112, inverse DPCM 114 and video signal image display 116. Data compression decoder 112 and DPCM 114 perform operations that are the inverse of those performed by data compression encoder 112 and DPCM 108, respectively. The result is that inverse DPCM 114 derives at its output a video signal that defines successive frames of synthesized television images. The synthesized signal output from inverse DPCM 114 is applied as an input to video signal image display 116, which displays the synthesized television images. Image display 116 displays television images that correspond to the original television images defined by the given video signal from source 106.

Due to the unrecoverable loss of image data resulting from image-data compression, the quality of the displayed synthesized images at the receiver is degraded with respect to the image quality of the original television images at the receiver. Nevertheless, image-data compression systems of the type shown in FIG. 1 are being used for such purposes as teleconferencing, because the cost of a communication channel having sufficient bandwidth to transmit the given video signal from source 106 without any image-data compression is usually prohibitive.

An illustrative embodiment of video signal source 106, which may be employed in the implementation of the present invention, is shown in FIG. 2. Interlaced analog video signal is generated by television camera 200 (which is assumed to be a standard NTSC television camera). The interlaced analog video signal is converted to an interlaced digital video signal by analog-to-digital (A/D) converter 202. The interlaced digital video signal is then further converted to a progressive scan digital video signal by interlace-to-progressive scan converter 204.

Interlace-to-progressive scan converter 204 does not alter the number of television scan lines per image frame. All that is altered is the order in which the television scan lines of an image frame occur. Specifically, in the case of an NTSC interlaced video signal, only the odd ones of the 525 scan lines of an image frame occur during a first field of a frame, while the even ones of the 525 television scan lines of an image frame occur thereafter during a second field of that frame, the rate of occurrence being 30 image frames (or 60 fields) per second. In this case, the progressive scan video signal output from converter 204 is still comprised of 30 image frames per second, but each frame is either comprised of a single field of all 525 television scan-lines thereof, which scan-lines occur in serial order, or, alternatively, each frame is comprised of only every other field (containing only one-half the 525 television scan-lines) of the NTSC interlaced video signal.

Since television camera 200 is assumed to be a color camera, there will be a separate video signal component for luminance (Y) and chrominance (I,Q) components. It should be understood that the Y, I and Q components for a color video signal can be replaced by three other independent color components, such as red, green and blue by way of example. If television camera 200 were a monochrome camera, rather than a color camera, the three separate color components would be replaced by a single luminance component. It should be understood that interlaced analog video signal need not be generated directly from a television camera, but can be generated by other means, such as a video tape recorder, by way of example. It should also be understood that while the use of a digital video signal in the implementation of the present invention is to be preferred, it is not essential. The present invention can be implemented with an analog video signal, in which case A/D 202 need not be employed.

Figure 3:
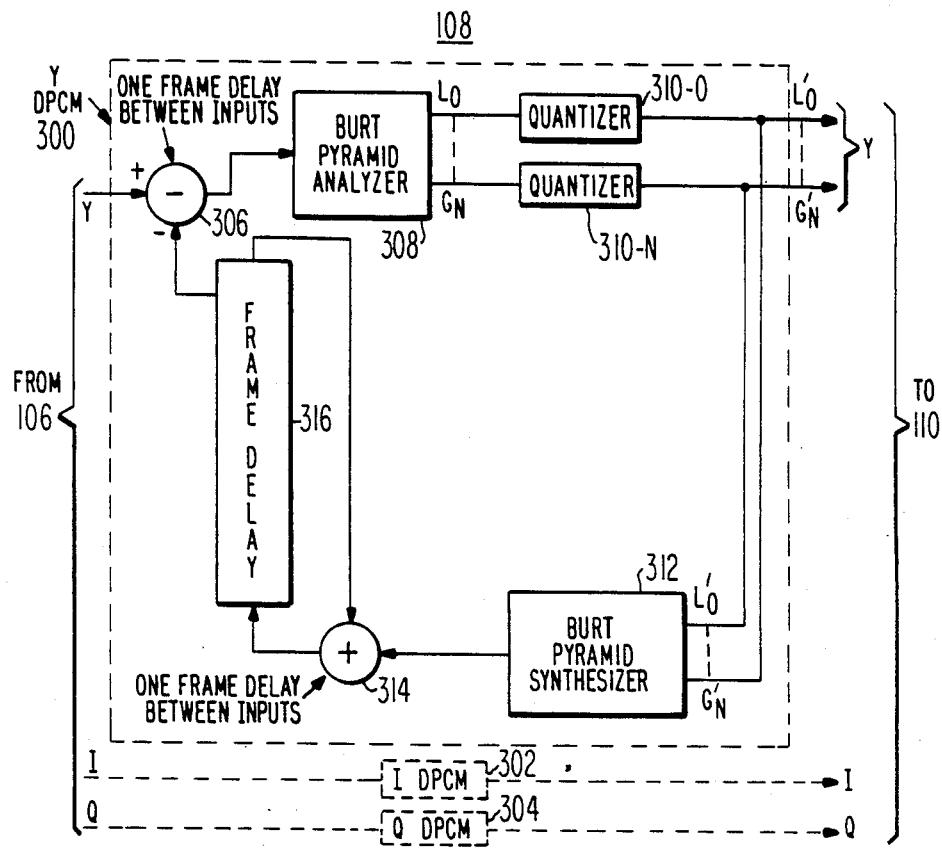
FIG. 3 is a block diagram of an embodiment of the differential pulse code modulator (DPCM) of FIG. 1 which may be employed by the present invention.

DPCM 108 of transmitter 100 employed by the present invention differs significantly in implementation from those employed in the past by the prior art. Specifically, the DPCM employed by the present invention incorporates a pyramid analyzer to derive as an output an ordinally-arranged set of (N+1) separate quantized video signals, where N is a specified integer, from the difference in level values of corresponding pixels of at least each pair of successive frames of the uncompressed digital television images defined by a given video signal output from video signal source 106. Then, a pyramid synthesizer is employed to recover a synthesized video signal from the set of (N+1) separate quantized video signals. FIG. 3 illustrates a preferred embodiment of the DPCM 108 employed by the present invention.

If the given video signal from source 106 is a color signal, as has been assumed, the embodiment of DPCM 108 shown in FIG. 3 includes Y DPCM 300, I DPCM 302 and Q DPCM 304. However, should this given video signal be a monochrome signal, DPCM 108 would be comprised of only Y DPCM 300. Y DPCM 300 is comprised of subtraction means 306, Burt Pyramid analyzer 308, quantizers 310-0 ... 310-N, Burt Pyramid synthesizer 312, summation means 314 and frame delay 316.

The Y component of the given video signal from source 106 is applied to a first or plus (+) input of subtraction means 306 and a first feedback video signal applied to a second or minus (−) input of subtraction means 306. This first feedback video signal is derived as a first output from frame delay 316. The time delay between corresponding pixels of the respective video signals applied to the plus and minus inputs of subtractions means 306 is exactly one frame period. Therefore, subtraction means 306 derives a subtraction output video signal in which the level value of each successive pixel thereof is substantially equal to the difference in the respective level values of corresponding pixels of the given video signal and the first feedback video signal applied respectively to the plus and minus inputs of subtraction means 306.

The subtraction output video signal from subtraction means 306 is applied as an input to Burt Pyramid analyzer 308, which analyzes the spatial frequency spectrum of each of successive frames of differential images defined by the subtraction output video signal applied thereto. Burt Pyramid analyzer 308 derives as an output therefrom (N+1) separate sub-spectra output video signals $L_0 \ldots G_N$, where N is a specified integer. As is known from the prior art discussed above, the respective L (Laplacian) sub-spectra output video signals from a Burt Pyramid analyzer define an ordinally-arranged set of contiguous two-dimensional spatial-frequency bandpass sub-spectra of the analyzed spatial frequency spectrum, with $L_0$ defining the highest spatial frequency bandpass sub-spectrum. Preferably, each of these bandpass sub-spectra should have a nominal bandwidth of one octave, in order to closely match the operation of the human visual system. The $G_N$ (Gaussian) sub-spectrum output video signal from Burt Pyramid analyzer 308 defines a low pass sub-spectrum that comprises those spatial frequencies of the analyzed spectrum which are below those included in the lowest bandpass sub-spectrum. Furthermore, the $L_0$ separate sub-spectrum output video signal from analyzer 308 exhibits a pixel density that is no greater than (and is preferably equal to) the pixel density exhibited by the subtraction output video signal applied as an input to analyzer 308, while each separate L sub-spectrum output video signal below $L_0$ exhibits a pixel density which is below (preferably one-fourth) that of its immediately next-higher L sub-spectrum output video signal. The $G_N$ output video signal exhibits a pixel density no greater than (but usually one-fourth of) the pixel density exhibited by the $L_{N-1}$ (i.e., its next-higher sub-spectrum output video signal).

From the foregoing, it can be seen that although each relatively lower sub-spectrum (e.g., $G_N$) sub-spectrum output video signal from analyzer 308 is comprised of fewer pixels per unit time than each relatively higher (e.g., $L_0$) sub-spectrum output video signal. Nevertheless the total number of pixels per unit time of the entire ordinally-arranged set of sub-spectra output video signals $L_0 \ldots G_N$ is somewhat greater (about 30% in the case of a pixel density ratio of one-fourth between successive members of the set) than the number of pixels per unit time in the subtraction output video signal input to analyzer 308. Further, the level value of each pixel is digitally represented by a given multibit (e.g., eight-bit) number. Therefore, since the total number of bits of the output from analyzer 308 is greater than at the input to analyzer 308, the effect of the presence of analyzer 308 itself is to expand the amount of image data, rather than reducing it as desired.

However, as indicated in FIG. 3, each of the sub-spectra output video signals $L_0 \ldots G_N$ from analyzer 308 is applied as an input to its own separate quantizer 310-0 . . . 310-N. This permits the pixel level values of the respective $L_0 \ldots G_N$ separate sub-spectra video output signals from analyzer 308 to be independently quantized by different amounts. More specifically, because both the threshold contrast-sensitivity function and the ability to detect a change in contrast which is above threshold of the human visual system falls off rapidly as the image spatial frequency increases, the pixel gray-scale level value of a relatively higher spatial frequency sub-spectrum video output signal (e.g., $L_0$) can be quantized by its quantizer (e.g., 310-0) into a relatively small number of preselected level values compared to the quantization of a relatively lower spatial frequency sub-spectrum output video signal (e.g., $G_N$) by its quantizer (e.g., 310-N). The result is that a quantized output video signal $L'_0$ from quantizer 310-0 has the highest pixel density but a relatively low number of pixel gray scale level values, while a quantized output video signal from $G'_N$ from quantizer 310-N has the lowest pixel density of a relatively high number of pixel gray scale level values. This arrangement makes it possible to minimize the effective degradation in observed image quality by a human viewer of displayed images at the receiver, due to any given amount of image-data compression.

The preselected amount of quantization in pixel level values provided by each of respective quantizers 310-0 . . . 310-N may be fixed. However, the amount of image data in an original image depends on image content. This means that the fixed preselected amounts of gray-scale compression by respective quantizers 310-0 . . . 310-N must be sufficient to transmit an original image having a high amount of image-data content over the limited bandwidth communication channel without undue degradation of such an image. Consequently, the full available bandwidth of the limited bandwidth communication channel is not completely employed in the transmission of original images having relatively low amounts of image-data content. This is both an inefficient use of the available bandwidth of the limited bandwidth communication channel, and, on average, decreases the image quality of the transmitted images. For this reason, it is desirable that, in practice, each of the respective quantizers 310-0 . . . 310-N be an adaptable quantizer, in which the preselected amount of quantization provided thereby can be controllably adjusted in accordance with the image-data content of the image being transmitted. In this case, computing means (not shown) responsive to image-data content of the original image then being transmitted would be programmed to adjust the preselected amount of quantization introduced by quantizers 310-0 . . . 310-N in accordance with the amount of image-data content in each successively transmitted image to provide the least amount of gray-scale compression required to substantially maximize the use of the full bandwidth of the limited bandwidth communication channel, without exceeding this limited bandwidth.

There are cases in which it is desired to eliminate the $L_0$ video output signal from Burt Pyramid analyzer 308 altogether (i.e., to effectively quantize all pixels thereof to a zero level value). In this case, quantizer 310-0 is an open circuit, so that the $L'_0$ quantized video output signal does not exist. Further, in some cases it is desirable not to quantize $G_N$ video output signal from analyzer 308 at all. In this case, quantizer 310-N is a short circuit, forwarding the $G_N$ video output signal from analyzer 308 as the $G'_N$ output from quantizer 310-N. With such possible exceptions, all of the quantized video output signals $L'_0 \ldots G'_N$ from quantizers 310-0 . . . 310-N are forwarded as an output from Y DPCM 300 to data compression encoder 110 and also as an input to Burt Pyramid synthesizer 312.

Burt Pyramid synthesizer 312 reconstructs a synthesized video signal which defines a differential image that corresponds with the differential image applied as an input to Burt Pyramid analyzer 308 from subtraction means 306. However, it should be understood that none of the gray-scale image information that is lost in quantizers 310-0 . . . 310-N is recovered. Therefore, the differential image defined by the synthesized video signal from synthesizer 312 is somewhat degraded with respect to the differential image defined by the input to analyzer 308 from subtraction means 306.

The synthesized video signal from synthesizer 312 is applied as a first input to summation means 314 and a second feedback signal from frame delay 316 is applied as a second input to summation means 314. Summation means 314 adds the respective pixel level values of corresponding pixels of the synthesized video signal and the second feedback signal applied respectively to its first and second inputs, thereby deriving a summation output video signal therefrom which defines an image corresponding to the original image defined by the plus input of subtraction means 306 from video source 106.

Frame delay 316, which may be comprised of either a random access memory or a serial memory, inserts a time delay between its input and its second output that is exactly equal to one frame period. Thus, the second feedback signal derived from a second output of frame delay 316, defines a predicted image, which is applied as the second input to summation means 314. The differential image defined by the synthesized video signal applied to the first input of summation means 314 corresponds to an error image, which, when added to the predicted image, provides a correction to the predicted image which brings the predicted image up to date.

The time delay between the input to frame delay 316 and the first output therefrom, which is applied as the first feedback video signal to the minus input of subtraction means 306, is less than one frame period by an amount which is exactly equal to the total inherent time delay inserted by analyzer 308, quantizers 310-0 . . . 310-N and synthesizer 312. Therefore, the time delay between corresponding pixels of the given video signal applied to the plus input of subtraction means 306 and the first feedback video signal applied with a minus input of subtraction means 306 is also exactly one frame period.

As is known in the art, the advantage of the Burt Pyramid is that a Burt Pyramid analyzer operating together with a corresponding Burt Pyramid synthesizer, in themselves (i.e., ignoring any effect of alteration means, such as quantizers 310-0 . . . 310-N) does not introduce any substantial amount of loss of image information or the introduction of any substantial amount of spurious (aliasing) artifacts. It is for this reason that it is preferred that analyzer 308 and synthesizer 312 be a Burt Pyramid analyzer and synthesizer. However, it should be understood that other types of pyramid analyzers and synthesizers (such as the FSD pyramid analyzer with or without the FSD pyramid synthesizer) may be substituted for pyramid analyzer 308 and/or Burt Pyramid synthesizer 312. However, it is essential that the input to the synthesizer be the set of separate video signals subsequent to the quantization thereof.

If the video signal from source 106 is a color video signal, DPCM 108 includes two additional DPCM, such as I DPCM 302 and Q DPCM 304, for operating on the chrominance components of the video signal from source 106. I DPCM 302 and Q DPCM 304 are comprised of N-stage structure which is substantially similar to that of a luminance component Y DPCM 300, described above. However, because the spatial frequency spectrum of the chrominance components is smaller than the luminance spatial frequency spectrum, one or more of the higher spatial-frequency Laplacian signals ($L_0$, $L_1$) of the respective Burt Pyramid analyzer and synthesizer of each of I DPCM 302 and Q DPCM 304 can be ignored (i.e., quantized to zero). Further, because the contrast sensitivity of the human visual system for color is lower than it is for brightness, the quantizers of I DPCM 302 and Q DPCM 304 possibly may be able to quantize even some of the lower spatial frequency level respective I and Q components to a fewer number of level values than the corresponding levels of the Y component. Of course, if the video signal from source 106 is a monochrome signal, the I DPCM 302 and Q DPCM 304 are dispensed with altogether.

Figure 4:
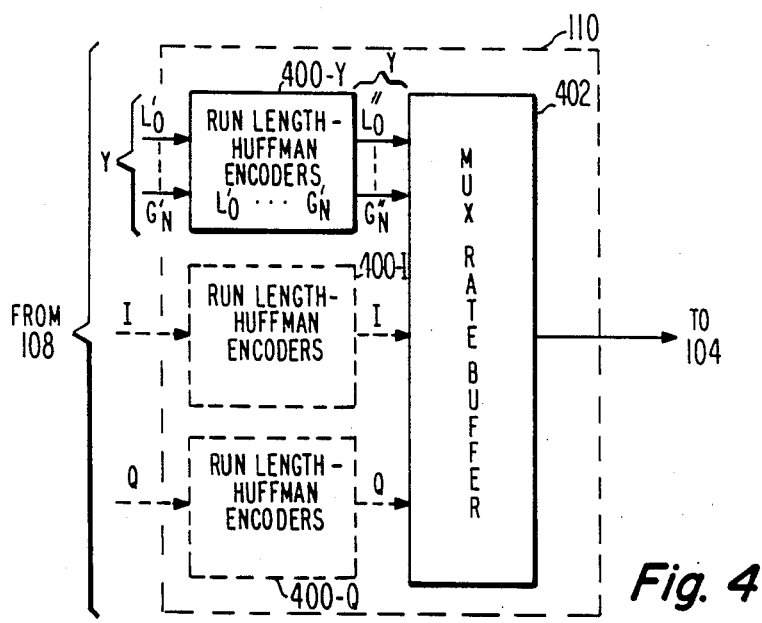
FIG. 4 is a block diagram of an embodiment of the data compression encoder of FIG. 1 which may be employed by the present invention.

Referring to FIG. 4, there is shown a preferred embodiment of data compression encoder 110, which includes run length-Huffman encoders 400-Y, 400-I, and 400-Q, and multiplexor (MUX) rate buffer 402. The separate $L'_0 \ldots G'_N$ quantized video signals from each of Y, I and Q DPCM 300, 302 and 304 are separately applied to each of a set of separate run length-Huffman encoders $L'_0 \ldots G_N$ within each of respective encoders 400-Y, 400-I and 400-Q. In particular, each of these separate quantized video signals is first run-length encoded, and then the resulting run-length code is itself Huffman encoded, to provide separate run length-Huffman encoded output video signals $L''_0 \ldots G''_N$ from each of the respective encoders 400-Y, 400-I and 400-Q. All of these separate run length-Huffman encoded video signals are applied as inputs to MUX rate buffer 402, which converts them to a single serial output video signal that can be transmitted in real time to receiver 102 over limited bandwidth communication channel 104. While the use of run length-Huffman encoders is to be preferred, it should be understood that data compression encoder 110 may make use of other known data compression encoding schemes.

Figure 5:
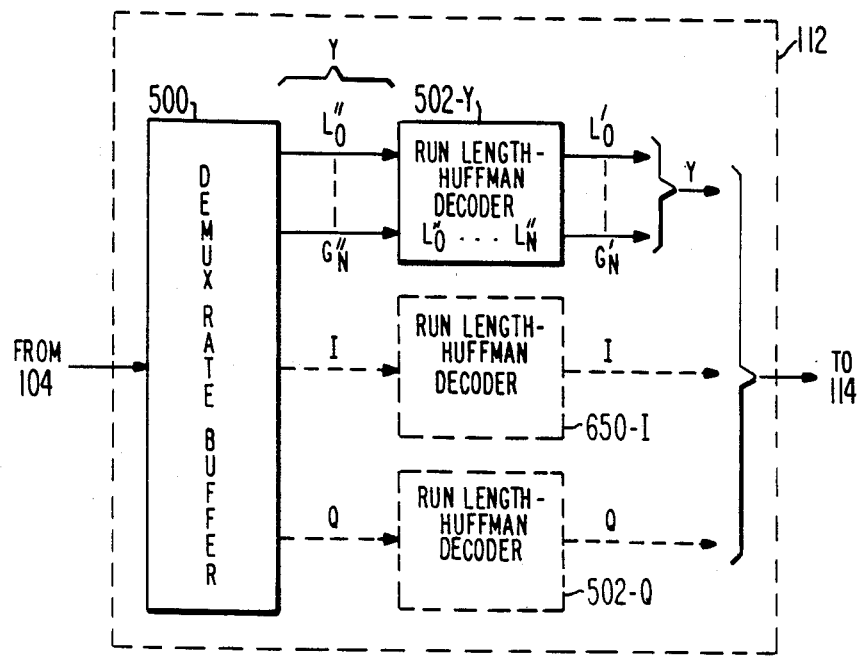
FIG. 5 is a block diagram of an embodiment of the data compression decoder of FIG. 1 which may be employed by the present invention.

FIG. 5 is directed to an illustrative embodiment of data compression decoder 112 which cooperates with the illustrative embodiment of data compression encoder 110 shown in FIG. 4. Specifically, the illustrative embodiment of data compression decoder 112 shown in FIG. 5 is comprised of demultiplexer (DEMUX) rate buffer 500 and respective run length-Huffman decoders 502-Y, 502-I and 502-Q, which perform at receiver 102 the inverse operation on the serial video signal input thereto from limited bandwidth communication channel 104 from that performed at transmitter 100 by MUX rate buffer 402 and respective run-length-Huffman encoders 400-Y, 400-I and 400-Q of the illustrative embodiment of data compression encoder 110 shown in FIG. 4. The result is that the respective Y, I and Q component separate quantized video signals $L'_0 \ldots G'_N$ are recovered at the respective outputs of each of the encoders 502-Y, 502-I and 502-Q. These recovered separate quantized video output signals are then applied as an input to inverse DPCM 114.

Figure 6:
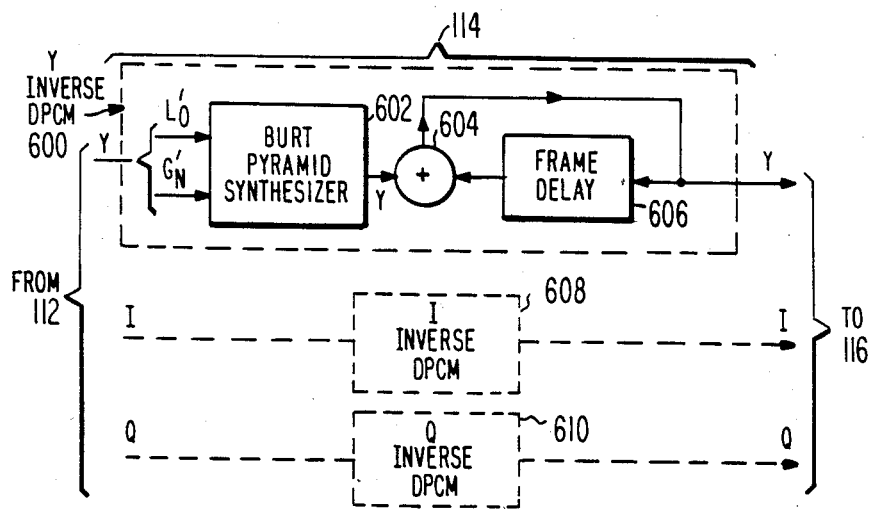
FIG. 6 is a block diagram of an embodiment of the inverse DPCM of FIG. 1 which may be employed by the present invention.

FIG. 6 is directed to an illustrative embodiment of inverse DPCM 114 which is employed by the present invention. As indicated in FIG. 6, Y DPCM 300 is comprised of Burt Pyramid synthesizer 602, summation means 604 and frame delay 606. Burt Pyramid synthesizer 602, summation means 604 and frame delay 606 of the Y inverse DPCM 600 of receiver 102 is substantially similar in structure and function to Burt Pyramid synthesizer 312, summation means 314 and frame delay 316 of Y DPCM 300 of transmitter 100. Specifically, Burt Pyramid synthesizer 602 operates on the Y component $L'_0 \ldots G'_N$ quantized video signals applied as inputs thereto for deriving a synthesized video output signal therefrom which defines a differential image that is applied as a first input to summation means 604 is also applied as an input to frame delay 606. After a time delay that is exactly equal to one frame period, each pixel of the synthesized video signal applied as a input to frame delay 606 appears at the output of frame delay 606 and is applied as a feedback input to summation means 604. The output video signal from summation means 604 is the Y component of the video signal applied to video signal image display 116.

I inverse DPCM 608 and Q inverse DPCM 610, which operate in a manner substantially similar to Y inverse DPCM 300, provide the I and Q components of the video signal input to video signal image display 116.

Figure 7:
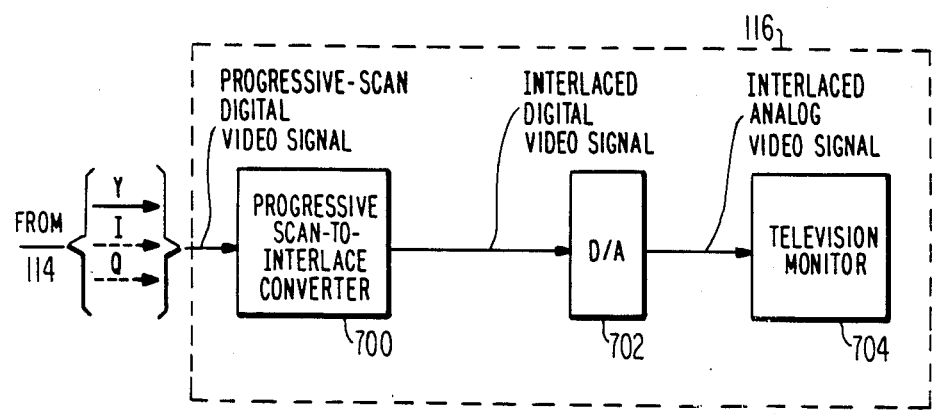
FIG. 7 is a block diagram of an embodiment of the video signal image display of FIG. 1 which may be employed by the present invention.

FIG. 7 is directed to an illustrative embodiment of video signal image display 116. In particular, the video signal output from 114, which defines successive frames of images to be displayed, is a progressive-scan digital video signal. Therefore, this signal is first converted to an interlaced-scan digital video signal by progressive scan-to-interlace converter 700, and then converted from an interlaced digital video signal to an interlaced analog video signal by digital-to-analog (D/A) converter 702. The interlaced analog video signal is then applied to a standard television monitor 704, which displays the successive television images defined thereby.

What is claimed is:

1. In a method for transmitting in real time compressed image-data, derived from a given video signal that defines the gray-scale level value of each successive pixel of each of successive frames of uncompressed original television images that exhibit a given relatively high pixel density, over a limited bandwidth communication channel to a receiver, and for displaying at said receiver successive frames of synthesized television images derived from said transmitted compressed image-data; the improvement comprising the steps of:

(a) deriving from a combination of said given video signal and a feedback signal that defines the difference in level values of corresponding pixels of at least each pair of successive frames of said original television images, an ordinally-arranged set of (N+1) separate video signals, where N is a specified positive integer, the first separate video signal of said set defining the highest spatial frequency bandpass sub-spectrum image component of the spatial frequency spectrum of a differential image corresponding to at least that pair of successive frames of said original television images, the image component of said differential image defined by said first separate video signal of said set exhibiting a first pixel density that is equal to or less than said given pixel density, each other separate video signal of said set except said last separate video signal of said set defining a spatial frequency bandpass sub-spectrum image component of said spatial frequency spectrum that is lower than that defined by its immediately preceding separate video signal of said set, the image component of said differential image defined by each other separate video signal of said set exhibiting a pixel density that is less than the pixel density exhibited by the image component defined by its immediately preceding separate video signal of said set, and said last separate video signal of said set defining a spatial frequency low pass sub-spectrum image component of said spatial frequency spectrum that is lower than that defined by its immediately preceding separate video signal of said set, the pixel density of the image component of said differential image defined by said last separate video signal of said set being no greater than the pixel density exhibited by the image component defined by its immediately preceding separate video signal of said set;

(b) quantizing said video signals of said set to reduce the number of gray-scale level values of the pixels of at least one of said separate video signals of said set;

(c) subsequent to said quantizing, separately compression-encoding each separate video signal of said set, and transmitting said separately compression-encoded video signals to said receiver over said limited bandwidth communication channel; and (d) subsequent to said quantizing, deriving said feedback signal from said separate video signals of said set.

2. The method defined in claim 1, wherein said given video signal is a digital signal comprised of a binary code containing a first given plurality of bits, said first given plurality of bits being sufficient in number to define with relatively high resolution the gray-scale level value of each successive pixel of each of said successive frame of said uncompressed original images; and wherein:

step (b) comprises quantizing one or more of said separate video signals of said set by sufficient amounts to permit the gray-scale level value of all of the pixels of all of said separate video signals of said set, subsequent to said quantizing, to be separately compression-encoded by step (c) with a second binary code containing a second given number of bits, wherein second given number is smaller than said first given number; and step (c) comprises separately compression-encoding each separate video signal of said set, subsequent to said quantizing, with said second binary code.

3. The method defined in claim 2, wherein:

the first pixel density exhibited by the image component of said differential image defined by said first separate video signal of said set derived in step (a) is equal to said given pixel density; and step (b) comprises the step of quantizing said video signals of said set to reduce the number of gray-scale level values of the pixels of said first separate video signal.

4. The method defined in claim 3, wherein:

step (b) comprises the step of quantizing said video signals of said set without reducing the gray-scale level values of the pixels of said last separate video signal of said set.

5. The method defined in claim 3, wherein:

step (b) includes the step of quantizing said video signal of said set to reduce the gray-scale level values of all the pixels of said first separate video signal to a single level value, the value of said single level being zero.

6. The method defined in claim 3, where N is a given plural integer, whereby said set of separate video signals includes at least one of said other video signals; and wherein:

step (b) includes quantizing said separate video signals of said set to reduce the number of gray-scale level values of the pixels of said one other separate video signal.

7. The method defined in claim 6, wherein:

step (b) comprises the step of quantizing said separate video signals to reduce the pixel gray scale of said first separate video signal to a first predetermined number of level values and to reduce the pixel gray scale of said one other separate video signal to a second predetermined number of level values, said second predetermined number being larger than said first predetermined number.

8. The method defined in claim 7, wherein said first given plurality of bits is eight bits, whereby the pixel gray scale of said uncompressed original images contains a maximum of 256 level values including a zero-level-value, and wherein:
  said second predetermined number is no greater than one-hundred-twenty eight.

9. The method defined in claim 3, wherein said first given plurality of bits is eight bits, whereby the pixel gray scale of said uncompressed original images contain a maximum of 256 level values including a zero-level-value, and wherein:
  said first predetermined number is no greater than one-hundred-twenty-eight.

10. In a transmitter for transmitting compressed image data to a receiver over a limited bandwidth communication channel, wherein said transmitter includes a differential pulse code modulator (DPCM), means for applying as an input to said DPCM a given video signal that defines with a given pixel density the level value of each successive pixel of each of successive frames of uncompressed two-dimensional image data, and means for data-compressing the image data derived as an output from said DPCM; the improvement in which said DPCM comprises:
  subtraction means having a first input to which said given video signal is applied, a second input to which a first feedback video signal is applied, and an output from which a subtraction output video signal is derived, in which the level value of each successive pixel of said subtraction output video signal is substantially equal to the difference in the respective level values of corresponding pixels of said given video signal and said first feedback video signal;
  a pyramid analyzer that analyzes the spatial frequency spectrum of each of successive frames of differential images represented by said subtraction output video signal applied thereto for deriving a plurality of separate sub-spectra video signals, wherein each of said sub-spectra video signals except said lowest spatial frequency sub-spectra video signal is a bandpass sub-spectrum video signal and said lowest spatial frequency sub-spectra video signal is a low-pass sub-spectrum video signal, and each bandpass sub-spectrum video signal below the highest spatial frequency bandpass sub-spectrum video signal exhibits a pixel density which is below that of its immediately next-higher bandpass sub-spectrum video signal and said low-pass sub-spectrum video signal exhibits a pixel density which is no greater than its immediately next-higher bandpass sub-spectrum video signal;
  means including quantizer means for separately forwarding said plurality of separate sub-spectra video signals as a plurality of separate output video signals that constitute said DPCM output, said quantizer means separately reducing the number of gray-scale level values of the pixels of at least one of the separate sub-spectra video signals prior to its being separately forwarded as an output video signal;
  a pyramid synthesizer responsive to said plurality of forwarded separate-output video signals applied thereto for deriving a single synthesized video signal from said plurality of forwarded output video signals, said single synthesized video signal exhibiting the same pixel density as that of said given video signal;
  summation means having a first input to which said single synthesized video signal is applied, a second input to which a second feedback video signal is applied, and an output from which a summation output video signal is derived, in which the level value of each successive pixel of said summation output video signal is substantially equal to the sum of the respective level values of corresponding pixels of said single synthesized video signal and said second feedback video signal; and
  frame delay means to which said summation output video signal is applied as an input, said frame delay means deriving said respective first and second feedback video signals as separate outputs therefrom, wherein the time delay between corresponding pixels of said given video signal and said first feedback video signal is one frame period and the time delay between corresponding pixels of said single synthesized video signal and said second feedback video signal also is one frame period.

11. The transmitter defined in claim 10, wherein:
  said highest spatial frequency sub-spectrum exhibits a pixel density equal to that of said given video signal, and of each bandpass sub-spectrum video signal below the highest spatial frequency bandpass sub-spectrum video signal exhibits a pixel density which is substantially one-quarter the pixel density of its immediately next-higher bandpass sub-spectrum video signal; and
  the nominal bandwidth of each of said bandpass sub-spectra video signals is substantially one octave of said spatial frequency spectrum in each of the two dimensions of each of said differential images.

12. The transmitter defined in claim 11, wherein:
  the pixel density of said low-pass sub-spectrum video signal is substantially one-quarter the pixel density of its next-higher bandpass sub-spectrum video signal.

13. The transmitter defined in claim 12, wherein:
  said pyramid analyzer is a Burt Pyramid analyzer; and
  said pyramid synthesizer is a Burt Pyramid synthesizer.

14. The transmitter defined in claim 10, wherein:
  said pyramid analyzer is a Burt Pyramid analyzer; and
  said pyramid synthesizer is a Burt Pyramid synthesizer.

15. The transmitter defined in claim 10, wherein:
  said quantizer means includes means for separately reducing the number of gray-scale level values of the pixels of each of said bandpass sub-spectra video signals prior to its being separately forwarded as an output video signal;

16. The transmitter defined in claim 15, wherein:
  said sub-spectra video signals include at least two bandpass sub-spectra video signals; and
  said quantizer means includes means for reducing the number of gray-scale level values of the highest spatial frequency bandpass sub-spectrum video signal to a given specified number of gray-scale level values, and separate means for reducing the number of gray-scale level values of each of the other bandpass sub-spectra video signals to a specified number of gray-scale level values associated therewith that is larger than said given specified number.

17. The transmitter defined in claim 16, wherein:
  the specified number of gray-scale level values associated with each other bandpass sub-spectra video signals is at least large as its immediately next-higher bandpass sub-spectrum video signal.

18. A receiver for receiving in real time compressed image data transmitted from a transmitter to said receiver over a limited bandwidth communication channel, wherein said compressed image data comprises a data-compression-encoded ordinally-arranged set of a plurality of separate video signals that respectively define substantially different sub-spectra of the spatial frequency spectrum of a differential image corresponding to at least a pair of successive frames of original television images; said receiver comprising:

a data-compression decoder for separately decoding each of said separate video signals of said data-compression-encoded set to derive a decoded ordinally-arranged set of said plurality of separate video signals; and an inverse differential pulse code modulator (DPCM) for synthesizing a single output video signal defining successive frames of television images corresponding to said original television images in response to said decoded ordinally-arranged set of said plurality of separate video signals being applied as an input thereto.

19. The receiver defined in claim 18, wherein said differential image corresponds to each pair of immediately successive frames of original television images; and wherein said inverse DPCM includes:

a pyramid synthesizer responsive to said decoded set of said plurality of separate video signal being applied thereto for deriving therefrom a first single synthesized video signal corresponding to said differential image;

summation means having a first input to which said first single synthesized video signal is applied, a second input to which a feedback video signal is applied, and an output from which a second single synthesized video signal is derived which constitutes the output video signal from said inverse DPCM; and frame delay means to which said first single synthesized video signal is applied as an input, said frame delay means deriving said feedback video signal as an output therefrom, wherein the time delay between corresponding pixels of said first single synthesized video signal and said feedback video signal is one frame period.

20. The receiver defined in claim 19, wherein:
said pyramid synthesizer is a Burt Pyramid synthesizer.

* * * * *